United States Patent
Cifaldi et al.

(10) Patent No.: US 10,471,664 B2
(45) Date of Patent: Nov. 12, 2019

(54) METHOD FOR MOUNTING A FIBER COMPOSITE COMPONENT IN THE FLOW OF FORCE OF A CLAMP CONNECTION

(71) Applicant: Bayerische Motoren Werke Aktiengesellschaft, Munich (DE)

(72) Inventors: Sandro Cifaldi, Munich (DE); Juergen Lenz, Unterschleissheim (DE); Roman Sternagel, Munich (DE)

(73) Assignee: Bayerische Motoren Werke Aktiengesellschaft, Munich (DE)

( * ) Notice: Subject to any disclaimer, the term of this patent is extended or adjusted under 35 U.S.C. 154(b) by 348 days.

(21) Appl. No.: 15/247,996

(22) Filed: Aug. 26, 2016

(65) Prior Publication Data

US 2016/0361865 A1    Dec. 15, 2016

Related U.S. Application Data

(63) Continuation of application No. PCT/EP2015/052928, filed on Feb. 12, 2015.

(30) Foreign Application Priority Data

Feb. 28, 2014   (DE) .................. 10 2014 203 761

(51) Int. Cl.
*B29C 65/56* (2006.01)
*B29C 65/00* (2006.01)
(Continued)

(52) U.S. Cl.
CPC ........ *B29C 65/562* (2013.01); *B29C 66/0222* (2013.01); *B29C 66/0242* (2013.01);
(Continued)

(58) Field of Classification Search
CPC . B29C 65/562; B29C 66/949; B29C 66/1122; B29C 66/21; B29C 66/0242;
(Continued)

(56) References Cited

U.S. PATENT DOCUMENTS

| | | | |
|---|---|---|---|
| 4,744,627 A * | 5/1988 | Chande | B23K 26/067 385/137 |
| 2002/0011690 A1* | 1/2002 | Tojo | B28B 7/366 264/219 |

(Continued)

FOREIGN PATENT DOCUMENTS

| | | |
|---|---|---|
| CN | 1892055 A | 1/2007 |
| CN | 101469734 A | 7/2009 |

(Continued)

OTHER PUBLICATIONS

Machine Translation for JP 2010-253714A, Nov. 2010.*

(Continued)

*Primary Examiner* — Christopher J Besler
*Assistant Examiner* — Christine Pellazar Bersabal
(74) *Attorney, Agent, or Firm* — Crowell & Moring LLP

(57) ABSTRACT

A method is provided for mounting a fiber composite component in the force flow of a clamping connection. The fiber composite material is heated and locally compressed in a mounting region such that the fiber composite material sets by a predefined measure. The fiber composite component is then clamped in the mounting region.

16 Claims, 1 Drawing Sheet

(51) Int. Cl.
*F16B 5/02* (2006.01)
*B29K 105/06* (2006.01)

(52) U.S. Cl.
CPC .......... *B29C 66/1122* (2013.01); *B29C 66/21* (2013.01); *B29C 66/41* (2013.01); *B29C 66/721* (2013.01); *B29C 66/919* (2013.01); *B29C 66/929* (2013.01); *B29C 66/949* (2013.01); *F16B 5/02* (2013.01); *B29C 66/7212* (2013.01); *B29K 2105/06* (2013.01)

(58) Field of Classification Search
CPC . B29C 66/0222; B29C 66/929; B29C 66/919; B29C 66/41; B29C 66/721; B29C 66/7212; B29C 66/729; B29C 43/003; B29C 43/02; B29C 43/52; B29K 2105/06; F16B 5/02
See application file for complete search history.

(56) References Cited

U.S. PATENT DOCUMENTS

| | | |
|---|---|---|
| 2003/0021628 A1 | 1/2003 | Gudaitis et al. |
| 2009/0126180 A1 | 5/2009 | Keener |
| 2009/0169325 A1 | 7/2009 | Avila Gutierrez et al. |
| 2013/0189051 A1* | 7/2013 | Diehl ................ F16B 19/08 411/190 |
| 2014/0241831 A1 | 8/2014 | Diehl et al. |

FOREIGN PATENT DOCUMENTS

| | | |
|---|---|---|
| CN | 101474658 A | 7/2009 |
| CN | 101900159 A | 12/2010 |
| CN | 103216506 A | 7/2013 |
| CN | 103596739 A | 2/2014 |
| DE | 101 43 155 A1 | 3/2003 |
| DE | 10 2009 056 580 A1 | 5/2011 |
| DE | 10 2012 017 347 A1 | 3/2013 |
| EP | 2 617 519 A1 | 7/2013 |
| JP | 3-205132 A | 9/1991 |
| JP | 2010253714 A * | 11/2010 |
| WO | WO 2012-167950 A1 | 12/2012 |

OTHER PUBLICATIONS

International Search Report (PCT/ISA/210) issued in PCT Application No. PCT/EP2015/052928 dated May 11, 2015, with partial English translation (six (6) pages).

German Search Report issued in counterpart German Application No. 10 2014 203 761.1 dated Oct. 21, 2014, with partial English translation (fifteen (15) pages).

Chinese Office Action issued in counterpart Chinese Application No. 201580003007.1 dated Jan. 22, 2017 with English-language translation (fourteen (14) pages).

Chinese-language Office Action issued in counterpart Chinese Application No. 201580003007.1 dated Sep. 25, 2017 with English translation (five (5) pages).

* cited by examiner

METHOD FOR MOUNTING A FIBER COMPOSITE COMPONENT IN THE FLOW OF FORCE OF A CLAMP CONNECTION

CROSS REFERENCE TO RELATED APPLICATIONS

This application is a continuation of PCT International Application No. PCT/EP2015/052928, filed Feb. 12, 2015, which claims priority under 35 U.S.C. § 119 from German Patent Application No. 10 2014 203 761.1, filed Feb. 28, 2014, the entire disclosures of which are herein expressly incorporated by reference.

BACKGROUND AND SUMMARY OF THE INVENTION

The invention relates to a method for mounting a fiber composite component in the force flow of a clamping connection.

When fiber composite components are secured by clamping, the problem arises that, as a result of the settlement behavior of the fiber composite, the pretensioning force of the clamping connection decreases over time.

The term "settlement" describes the yielding of the material under the pretensioning force which is introduced therein when tightening a clamping connection. This effect may, for example, be brought about in plastics materials by the creeping of the plastics material under loading.

In order to reduce the loss of pretensioning force, for example, when screwing the fiber composites, metal bushes are introduced therein. Doing so is, however, complex and expensive.

An object of the invention is to provide a method by which the assembly of fiber composites in clamping connections is possible in a simpler manner.

To this end, in a method for mounting a component of a fiber composite in the force flow of a clamping connection, the following steps are provided:

(ii) heating the fiber composite, at least in an assembly region; and (ii) locally compressing the heated fiber composite in the assembly region so that the fiber composite settles to a predetermined degree; and (iii) clamping the component of the fiber composite in the assembly region.

As a result of the local compression of the heated fiber composite, there is produced in the assembly region an accelerated settlement operation, in which the thickness of the component is advantageously substantially already reduced to the extent which corresponds to the natural settlement operation without previous compression and heating. Since over time a smaller additional settlement of the material is carried out, the pretensioning force of the clamping connection is substantially maintained since the component gives way only to a small extent under the pretensioning force of the clamping connection. With this method, it is possible to allow a clamping force to act directly on the composite fiber component without the pretensioning force of the clamping connection significantly decreasing over time.

Preferably, the steps of heating and compressing are carried out prior to the step of installing in a clamping connection and separately therefrom, for example, in a device which is provided separately for this purpose.

In order to carry out the compression, the component is clamped, for example, between a die with a pressing face which corresponds to the assembly region and a retention member counter-face, wherein the pressing force which is required for the local settlement of the fiber composite is applied between the die and retention member counter-face.

In order to bring about the local action of temperature on the assembly region, for example, the die and/or the retention member counter-face can be heated.

The temperature of the die and/or the retention member counter-face during the compression may, for example, be from 80° C. to 250° C., in particular approximately 100° C. In this instance, the component of fiber composite is heated during the compression or prior to the compression preferably to from 80° C. to 250° C., in particular to approximately 100° C.

It is also possible to heat the component itself directly. This may be carried out, for example, in an external oven prior to the compression. If the fiber composite is electrically conductive, for instance, when carbon fibers are used, the component may also be heated to the desired temperature by means of a direct or induced current flow. Optionally, the heating may remain locally limited to the assembly region.

It has been found that compression with a surface pressure of from 20 to 140 MPa provides good results.

The duration of the compression may, for example, be from 1 to 5 minutes, in particular approximately 3 minutes.

In another variant, the fiber composite of the component is already mounted in the actual clamping connection prior to the local compression and this is used for the local compression, wherein the fiber composite of the component is heated at least in the assembly region. The heating may take place in this case as described above by means of heating in an external oven prior to the assembly and/or by means of the supply of heat during the compression, for example, by way of a current flow through the assembly region or another suitable type of local heating. The pressing force required for the accelerated settlement process during compression is in this instance applied by the clamping connection. After the assembly region has completed the compression operation and the component has cooled again, the clamping connection is finally tightened in order to definitively mount the component.

In the fiber composite component, at least one opening for a securing device may be introduced in the assembly region, for example, so that screw connections through the component are also possible.

It is possible to use as fiber composites in particular fiber-reinforced plastics materials, preferably those with a polymer matrix material. It is possible to use as reinforcement fibers, for example, carbon fibers, glass fibers, aramide fibers and/or basalt fibers, but also natural fibers such as, for example, hemp fibers. When continuous filaments are used, these can be embedded in the matrix as an interlaid scrim, braid and/or woven textile.

Other objects, advantages and novel features of the present invention will become apparent from the following detailed description of one or more preferred embodiments when considered in conjunction with the accompanying drawings.

DETAILED DESCRIPTION OF THE DRAWINGS

The drawings are not to scale.

In order to be able to connect a fiber composite component 10, for example, a carbon fiber reinforced plastics material, to another component 12 in a clamping connection 14 (see FIG. 2), without the pretensioning force applied as a result of the clamping connection 14 decreasing excessively as a result of a settlement of the fiber composite, the fiber composite component 10 is pre-treated in a first method step before the clamping connection 14 is produced.

Figure 1:
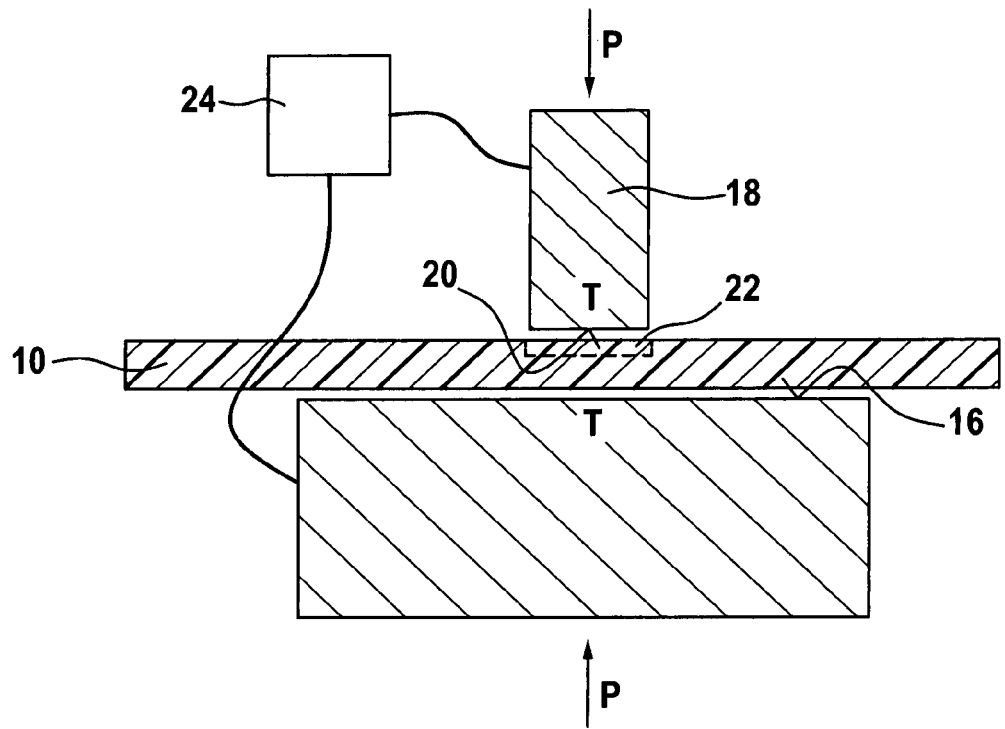
FIG. 1 is a schematic sectioned view of a fiber composite component clamped between a die and a retention member counter-face before a first step of the method according to the invention is carried out.

As shown in FIG. 1, to this end the fiber composite component 10 is clamped in a device between a retention member counter-face 16 and a die 18, wherein the die 18 has at the end thereof directed toward the component 10 a pressing face 20. The pressing face 20 corresponds in terms of shape and size to a subsequent assembly region 22.

There is applied between the die 18 and the retention member counter-face 16, a predetermined fixed surface pressure force P which produces, for example, a pressure between 20 and 140 MPa. Preferably, the surface pressure force P applied is equal to or greater than the pretensioning force subsequently applied by the clamping connection.

The pressure applied is maintained for some time, for example, approximately 3 minutes.

At the same time, in order to apply the surface pressure force P, the die 18 is heated in this case, in particular in the region of the pressing face 20 by way of a heating device 24 which determines a predetermined heating temperature T.

In this example, the retention member counter-face 16 in the region of the assembly region 22 is also further heated to the same temperature T at the same time. However, it would also be possible to heat only the die 18 or only the retention member counter-face 16.

The temperature T of the die 18 and/or the retention member counter-face 16 may, for example, be approximately 100° C., wherein the component 10 is also heated to a temperature of approximately 100° C. in this case.

It is also possible to heat the assembly region 22 in another manner, for example, before the introduction into the device in an external oven or, with an electrically conductive fiber composite, by means of current flow.

As a result of the action of pressure and temperature, the fiber composite component 10 settles below the pressing face 20 of the die 18 so that the thickness of the component 10 in the assembly region 22 is reduced. This is indicated in FIG. 2.

The pressure, time and temperature during the pressing operation are intended to be adapted to each other for the respective component at the discretion of the person skilled in the art. It is thus possible, for example, to reduce the surface pressure when a higher temperature is used in the assembly region.

After the heating and pressing operation has been completed, the component 10 is removed from the device and can now be further processed.

Figure 2:
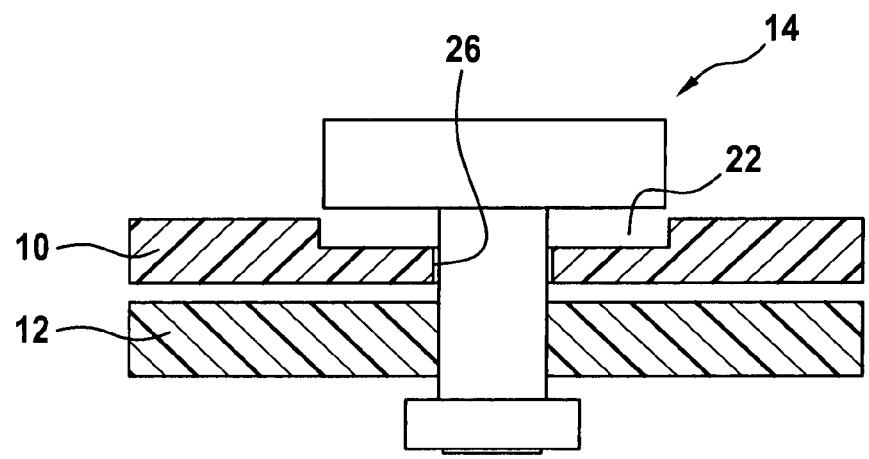
FIG. 2 is a schematic sectioned view of a clamping connection with a fiber composite component in a second step of a method according to the invention.

FIG. 2 shows an example of a clamping connection 14. Here, a screw/nut connection is provided between the pre-treated fiber composite component 10 and the additional component 12, wherein the individual components are illustrated spaced apart for reasons of clarity.

The component 10 has, in this instance, in the assembly region 22 a through-opening 26 through which the screw engages.

As a result of the screw head and as a result of the nut, a clamping force is applied in the assembly region 22 which has already been compressed by the previous settlement operation.

After the clamping connection 14 has been tightened, the pretensioning force applied is substantially maintained since, in the assembly region 22, the settlement process of the fiber composite is already substantially terminated and consequently with the action of the pretensioning force only an insignificant change of thickness is brought about.

In a possible variant, the clamping connection 14 is also used to carry out the accelerated settlement process by the assembly region 22 first being heated in an appropriate manner and the clamping connection 14 being tightened. After the fiber composite has settled to the desired extent and the component has cooled again, the clamping connection 14 is tightened with the definitive clamping force.

The foregoing disclosure has been set forth merely to illustrate the invention and is not intended to be limiting. Since modifications of the disclosed embodiments incorporating the spirit and substance of the invention may occur to persons skilled in the art, the invention should be construed to include everything within the scope of the appended claims and equivalents thereof.

What is claimed is:

1. A method for mounting a fiber composite component in a force flow of a clamping connection, the method comprising the acts of:
heating the fiber composite component;
locally compressing the heated fiber composite component in an assembly region such that the fiber composite component has a reduced thickness in the assembly region of the fiber composite component to produce in the assembly region an accelerated settlement operation in which the reduced thickness corresponds to a natural settlement operation without prior compressing and heating;
introducing a first through-opening into the fiber composite component in the assembly region; and
clamping the fiber composite component in the assembly region to a component by a securing device disposed through the first through-opening of the fiber composite component and a second through-opening of the component.

2. The method according to claim 1, wherein the fiber composite component is clamped for compression between a die with a pressing face which corresponds to the assembly region and a retention member counter-face.

3. The method according to claim 2, wherein the die and/or the retention member counter-face are heated.

4. The method according to claim 1, wherein the assembly region is heated by a current flow and/or prior to the compression by heating in an oven.

5. The method according to claim 3, wherein a temperature of the die and/or the retention member counter-face during the compression is from 80° C. to 250° C.

6. The method according to claim 5, wherein a temperature of the die and/or the retention member counter-face during the compression is 100° C.

7. The method according to claim 1, wherein a temperature of the fiber composite component during the compression is from 80° C. to 250° C.

8. The method according to claim 7, wherein a temperature of the fiber composite component during the compression is 100° C.

9. The method according to claim 1, wherein the compression is carried out with a surface pressure of from 20 to 140 MPa.

10. The method according to claim 5, wherein the compression is carried out with a surface pressure of from 20 to 140 MPa.

11. The method according to claim 7, wherein the compression is carried out with a surface pressure of from 20 to 140 MPa.

12. The method according to claim 1, wherein a duration of the compression is from 1 to 5 minutes.

13. The method according to claim 12, wherein a duration of the compression is 3 minutes.

14. The method according to claim 10, wherein a duration of the compression is 3 minutes.

15. The method according to claim 11, wherein a duration of the compression is 3 minutes.

16. The method according to claim 1, wherein the fiber composite component is a fiber-reinforced plastics material.

\* \* \* \* \*